United States Patent
Kawabe (10) Patent No.: US 11,023,694 B2
(45) Date of Patent: Jun. 1, 2021

(54) SALES DATA PROCESSING APPARATUS AND SALES DATA PROCESSING METHOD

(71) Applicant: TOSHIBA TEC KABUSHIKI KAISHA, Tokyo (JP)

(72) Inventor: Yuichiro Kawabe, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/506,681

(22) Filed: Jul. 9, 2019

(65) Prior Publication Data
US 2020/0193103 A1 Jun. 18, 2020

(30) Foreign Application Priority Data
Dec. 13, 2018 (JP) .............................. JP2018-233355

(51) Int. Cl.
G06K 15/00 (2006.01)
G06K 7/10 (2006.01)
A47F 9/04 (2006.01)

(52) U.S. Cl.
CPC .......... G06K 7/10445 (2013.01); A47F 9/048 (2013.01); G06K 7/10356 (2013.01); G06K 7/10475 (2013.01)

(58) Field of Classification Search
CPC ............................ A47F 9/048; G06K 7/10356; G06K 7/10445; G06K 7/10475; G07G 1/0009; G07G 1/009; G07G 3/003; G08B 13/246; G08B 21/24
See application file for complete search history.

(56) References Cited

U.S. PATENT DOCUMENTS

| 2005/0242957 A1* | 11/2005 | Lindsay | G06K 19/07345 340/572.7 |
| 2006/0261161 A1 | 11/2006 | Murofushi et al. | |
| 2007/0069858 A1* | 3/2007 | Kubo | G06K 19/07749 340/10.1 |
| 2007/0152829 A1* | 7/2007 | Lindsay | G06K 19/0717 340/572.3 |

(Continued)

FOREIGN PATENT DOCUMENTS

JP 2010055324 A 3/2010

OTHER PUBLICATIONS

Extended European Search Report dated Feb. 5, 2020, mailed in counterpart European Application No. 19191432.4, 8 pages.

*Primary Examiner* — Thien M Le
(74) *Attorney, Agent, or Firm* — Kim & Stewart LLP (57) ABSTRACT

In one embodiment, a sales data processing apparatus has a first and a second antennas, and a processor. The first antenna receives, from a wireless tag attached to a commodity, tag information to uniquely identify the relevant commodity. The second antenna receives the tag information from the wireless tag recovered by a recovery device. The processor judges whether the wireless tag attached to the commodity is a wireless tag required to be detached from the commodity, based on the tag information received by the first antenna. The processor judges whether the second antenna has received the tag information of the wireless tag which is judged to be the wireless tag required to be detached from the commodity.

12 Claims, 9 Drawing Sheets

(56) References Cited

U.S. PATENT DOCUMENTS

| | | | |
|---|---|---|---|
| 2008/0001747 A1* | 1/2008 | Kangas | G08B 13/2462 |
| | | | 340/572.1 |
| 2008/0297314 A1 | 12/2008 | Kuwako et al. | |
| 2009/0026262 A1 | 1/2009 | Suzuki | |
| 2010/0164691 A1* | 7/2010 | Berkhouwer | G08B 13/2448 |
| | | | 340/10.5 |
| 2016/0260302 A1* | 9/2016 | Ellers | G08B 13/2434 |
| 2016/0364968 A1* | 12/2016 | Sharpy | G08B 13/242 |
| 2016/0364969 A1* | 12/2016 | Casanova | E05B 73/0047 |
| 2017/0372562 A1 | 12/2017 | Terahara et al. | |
| 2020/0250948 A1* | 8/2020 | Ball | G07C 9/00309 |

* cited by examiner

| CLASSIFICATION PORTION | NOTIFICATION FLAG PORTION |
|---|---|
| CLASSIFICATION 1 | 1 |
| CLASSIFICATION 2 | 0 |
| CLASSIFICATION 3 | 1 |
| ⋮ | ⋮ |

Fig.9

SALES DATA PROCESSING APPARATUS AND SALES DATA PROCESSING METHOD

CROSS-REFERENCE TO RELATED APPLICATION

This application is based upon and claims the benefit of priority from the prior Japanese Patent Application No. 2018-233355, filed on Dec. 13, 2018, the entire contents of which are incorporated herein by reference.

FIELD

Embodiments described herein relate generally to a sales data processing apparatus and a sales data processing method.

BACKGROUND

Recently, in a store such as a general merchandising store, a supermarket, and a convenience store, a method is used in which an RFID (Radio Frequency Identifier) tag storing tag information related to a commodity is attached to the relevant commodity, and the tag information is read from the relevant RFID tag by a POS (Point of Sales) terminal to sell the commodity. In addition, particularly in a store such as a store selling goods, a crime prevention tag is attached to a commodity for crime prevention of the displayed commodity.

Meanwhile, when a commodity is heated by a microwave oven in a state in which an RFID tag is attached to the commodity, the RFID tag might catch fire. In addition, when a commodity in a state in which a crime prevention tag is attached is made to pass through a gate for theft prevention installed at a doorway of the store, the gate responds to a radio wave transmitted from the crime prevention tag to generate a large sound and so on. For the reason, it is necessary that the RFID tag and the crime prevention tag (hereinafter collectively called "a wireless tag") are detached from the commodity at the time point when the commodity has been sold.

However, since a lot of commodities are dealt in the store, it sometimes may be forgotten to detach the wireless tag.

DETAILED DESCRIPTION

According to one embodiment, a sales data processing apparatus has a first antenna, a recovery device, a second antenna, and a processor. The first antenna receives, from a wireless tag attached to a commodity, tag information to uniquely identify the relevant commodity. The recovery device recovers the wireless tag detached from the commodity. The second antenna receives the tag information from the wireless tag recovered by the recovery device. The processor judges whether the first antenna has received the tag information. When judging that the tag information has been received by the first antenna, the processor judges whether the wireless tag attached to the commodity is a wireless tag required to be detached from the commodity, based on the received tag information. The processor judges whether the second antenna has received the tag information of the wireless tag which is judged to be the wireless tag required to be detached from the commodity. Further, when judging that the tag information has been received by the second antenna, the processor executes a sales registration processing of the relevant commodity, based on the received tag information.

First Embodiment

Hereinafter, a sales data processing apparatus, a sales data processing method, and a program according to a first embodiment will be described with reference to the drawings. In the first embodiment, a POS terminal will be described as an example of a sales data processing apparatus. In addition, in the first embodiment, an RFID tag will be described as an example of a wireless tag. Meanwhile, in the drawings, the same symbols indicate the same or the similar portions. In addition, the sales data processing apparatus, and the sales data processing method described below are not limited to the first embodiment.

Figure 1:
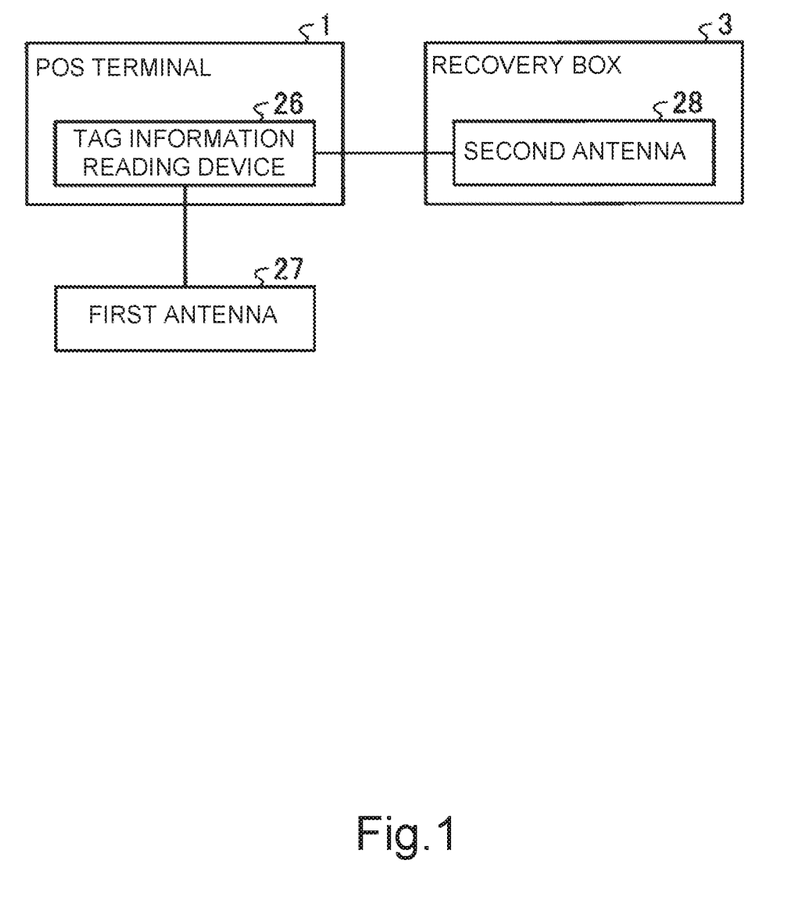
FIG. 1 is a description diagram showing the relation between a POS terminal and a wireless tag recovery box according to an embodiment.

To begin with, the relation between a POS terminal and a wireless tag recovery box according to a first embodiment will be described. FIG. 1 is a description diagram showing the relation between the POS terminal and the wireless tag recovery box according to the first embodiment. In a store, a lot of commodities are displayed on a commodity shelf and so on. A wireless tag (RFID tag) is attached to each of these commodities. The wireless tag has an antenna and a storage device. When the antenna receives each of radio waves transmitted from a first antenna 27 and a second antenna 28 (refer to FIG. 2, respectively) which are connected to the POS terminal and are described later, the wireless tag generates an electric power. The wireless tag transmits information stored in the storage device by the generated electric power. The information stored in the storage device is tag information including commodity identification information to identify a commodity, for example. The wireless tag has an adhesive surface, and is pasted on a commodity with an adhesive force of the adhesive surface. In addition, the wireless tag may be attached to a commodity with a band or the like. In addition, the commodity identification information is information to uniquely identify a commodity as an individual article. For example, in the case of purchasing two pieces of the same commodities (in the case of purchasing the two same milk packs, for example), in order to individually identify the respective individual articles, the commodity identification informations thereof are different. By this means, the commodity identification information can uniquely identify each individual article. In addition, information (a commodity code) to identify a commodity (a commodity called milk, for example) is included in the commodity identification information. A commodity name, a unit price and so on of the relevant commodity are stored in a commodity master 142 (refer to FIG. 3) descried later, in association with the commodity code. And the commodity name and the price of the commodity to be sold are read from the commodity master 142, based on the commodity code.

A customer who purchases a commodity moves to a checkout area provided in a store while putting the commodity in a basket or placing the commodity on a cart. One or a plurality of POS terminals 1 (a sales data processing apparatus) are installed in the checkout area. The POS terminal 1 executes a sales registration processing and a settlement processing of the commodity to be sold (the commodity which the customer purchases). The sales registration processing includes a processing to read the tag information. The sales registration processing includes a processing to read commodity information of the relevant commodity from the commodity master 142 (refer to FIG. 3), based on the commodity code included in the read tag information. The commodity information includes the commodity name, the price and so on. Further, the sales registration processing displays the read commodity information of the relevant commodity, and includes a processing to store the commodity information in a commodity information storage area 131. In addition, in the following description, the commodity information storage area 131 is simply called the commodity information portion 131 (refer to FIG. 2). The settlement processing includes a processing to display a total amount and a tax amount related to the transaction, based on the commodity information stored in the commodity information portion 131 as a result of the sales registration processing. The settlement processing includes a processing to calculate and display a change, based on a deposit deposited by the customer. Further, the settlement processing includes a processing to issue a receipt printed with the commodity information and the settlement information. The settlement information includes the total amount, the deposit amount, the change amount, and so on, for example. In addition, information in which the commodity information and the settlement information are combined is called sales information.

As shown in FIG. 1, the POS terminal 1 has a tag information reading device 26. In addition, the first antenna 27 and the second antenna 28 are electrically connected to the tag information reading device 26. The first antenna 27 receives tag information from a wireless tag attached to a commodity which a customer purchases. For the reason, the first antenna 27 is provided in the vicinity of a sacker table (not shown) on which a commodity is to be placed in the POS terminal 1. A salesclerk takes out a commodity which a customer purchases and moves it closer to the first antenna 27. Then, the first antenna 27 receives tag information from the wireless tag attached to the commodity. When the first antenna 27 receives the tag information, the tag information reading device 26 reads the relevant tag information.

In addition, as shown in FIG. 1, a recovery box 3 is installed in the vicinity of the POS terminal 1 as a recovery device. The salesclerk detaches the wireless tag from the commodity which the customer has purchased. And the salesclerk puts the detached wireless tag into the recovery box 3. The recovery box 3 is a box for recovering the detached wireless tag.

In addition, as shown in FIG. 1, the second antenna 28 is provided inside the recovery box 3, or in the vicinity of an inlet port of the recovery box 3. The second antenna 28 receives the tag information from the wireless tag recovered in the recovery box 3. When the second antenna 28 receives the tag information, the tag information reading device 26 reads the relevant tag information.

Figure 2:
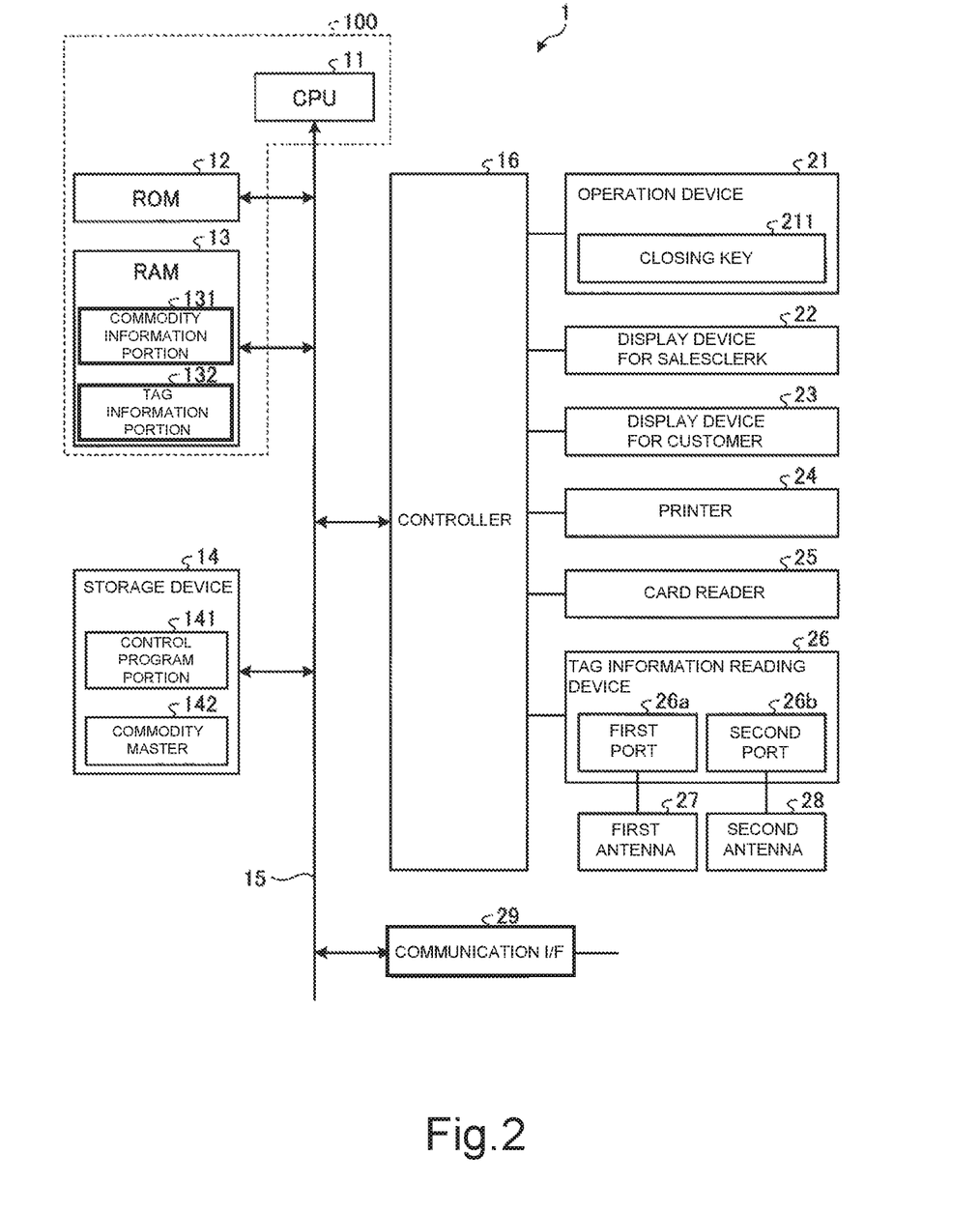
FIG. 2 is a block diagram showing a hardware configuration of a POS terminal according to a first embodiment.

Next, a hardware of the POS terminal 1 will be described. FIG. 2 is a block diagram showing a hardware configuration of the POS terminal 1. As shown in FIG. 2, the POS terminal 1 has a processor 100, a storage device 14 and so on. The processor 100 has a CPU (Central Processing Unit) 11, a ROM (Read Only Memory) 12, and a RAM (Random Access Memory) 13. The CPU 11 acts as a control main body. The ROM 12 stores various programs. The RAM 13 develops a program and various data. The storage device 14 stores various programs. The CPU 11, the ROM 12, the RAM 13, the storage device 14 are connected to each other, via a bus 15. That is, the CPU 11 operates in accordance with the control program which are stored in the ROM 12 and the storage device 14 and has been developed in the RAM 13, and thereby the processor 100 executes a control processing of the POS terminal 1 described later.

The RAM 13 has the commodity information portion 131 and a tag information storage area 132. In addition, in the following description, the tag information storage area 132 is simply called the tag information portion 132 (refer to FIG. 2). The commodity information portion 131 stores the commodity information (the commodity name, the price of the commodity, and so on) of the commodity of which the POS terminal 1 has performed the sales registration processing. The tag information portion 132 stores the tag information which the first antenna 27 has received.

The storage device 14 includes an HDD (Hard Disc Drive), a flash memory, and so on, for example. The storage device 14 maintains the stored contents even when the power source is cut off. The storage device 14 has a control program storage area 141 and the commodity master 142. In addition, in the following description, the control program storage area 141 is simply called the control program portion 141 (refer to FIG. 2). The control program portion 141 stores the control program for controlling the POS terminal 1. The commodity master 142 stores, in association with a commodity code to identify a commodity, a commodity name, a unit price, and so on of the relevant commodity. The commodity master 142 will be described later in FIG. 3.

As shown in FIG. 2, the processor 100 connects to an operation device 21, a display device 22 for salesclerk, a display device 23 for customer, a printer 24, a card reader 25, the tag information reading device 26, via the bus 15 and a controller 16. The operation device 21 is a keyboard including a closing key 2 to be operated by a customer, so as to close the transaction with the customer. The display device 22 for salesclerk is arranged toward a salesclerk. The display device 22 for salesclerk displays information for the salesclerk, such as the commodity information and the settlement information, to the salesclerk. The display device 23 for customer is arranged toward a customer. The display device 23 for customer displays information, such as the commodity information and the settlement information, to the customer. The printer 24 issues a receipt printed with the commodity information, the settlement information, and so on. The card reader 25 reads card information of a storage medium for settlement, such as a credit card.

In addition, as shown in FIG. 2, the tag information reading device 26 connects to the first antenna 27 and the second antenna 28. The tag information reading device 26 connects to the first antenna 27 via a first port 26a. The tag information reading device 26 connects to the second antenna 28 via a second port 26b. The tag information reading device 26 reads the tag information which the first antenna 27 has received via the first port 26a. The tag information reading device 26 reads the tag information which the second antenna 28 has received via the second ports 26b.

The processor 100 judges that the tag information read via the first port 26a is the tag information received by the first antenna 27. In addition, the processor 100 judges that the tag information read via the second port 26b is the tag information received by the second antenna 28.

In addition, the processor 100 connects to a communication interface (I/F) 29 via the bus 15. The communication interface 29 connects to a store server (not shown) that is a host device of the POS terminal 1.

Figure 3:
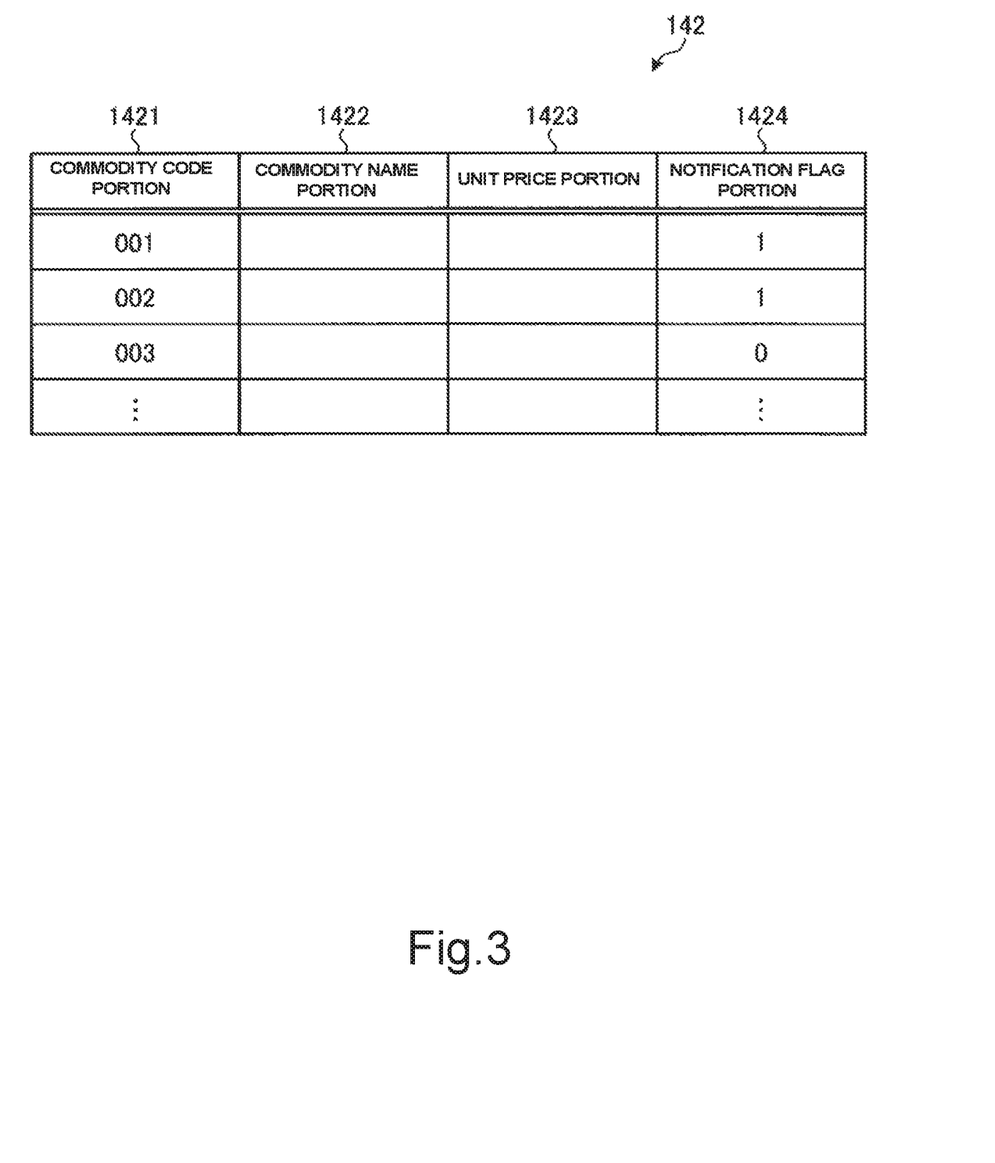
FIG. 3 is a memory map showing an example of a data configuration of the commodity master according to the first embodiment.

Next, the commodity master 142 will be described. FIG. 3 is a memory map showing an example of a data configuration of the commodity master 142. As shown in FIG. 3, the commodity master 142 has a commodity code storage area 1421, a commodity name storage area 1422, a unit price storage area 1423, and a notification flag storage area 1424. In addition, in the following description, the commodity code storage area 1421, the commodity name storage area 1422, the unit price storage area 1423, and the notification flag storage area 1424 are simply called the commodity code portion 1421, the commodity name portion 1422, the unit price portion 1423, and the notification flag portion 1424, respectively (refer to FIG. 3). The commodity code portion 1421 stores a commodity code to identify a commodity. The commodity mane portion 1422 stores a commodity name of the commodity identified by the commodity code stored in the commodity code portion 1421. The unit price portion 1423 stores a unit price of the commodity identified by the commodity code stored in the commodity code portion 1421.

The notification flag portion 1424 stores flag information indicating whether the wireless tag attached to the commodity identified by the commodity code stored in the commodity code portion 1421 is a wireless tag required to be detached from the relevant commodity. When flag information of the notification flag portion 1424 shown in FIG. 3 is "1", the relevant flag information "1" indicates that the wireless tag attached to the relevant commodity is a wireless tag required to be detached from the relevant commodity. In addition, when flag information of the notification flag portion 1424 is "0", the relevant flag information "0" indicates that the wireless tag attached to the relevant commodity is a wireless tag not required to be detached from the relevant commodity. That is, in the example shown in FIG. 3, the wireless tags attached to the commodities identified by the commodity codes "001", "002" stored in the commodity code portion 1421 are required to be detached from the relevant commodities, respectively. In addition, the wireless tag attached to the commodity identified by the commodity code "003" stored in the commodity code portion 1421 is not required to be detached from the relevant commodity.

Figure 4:
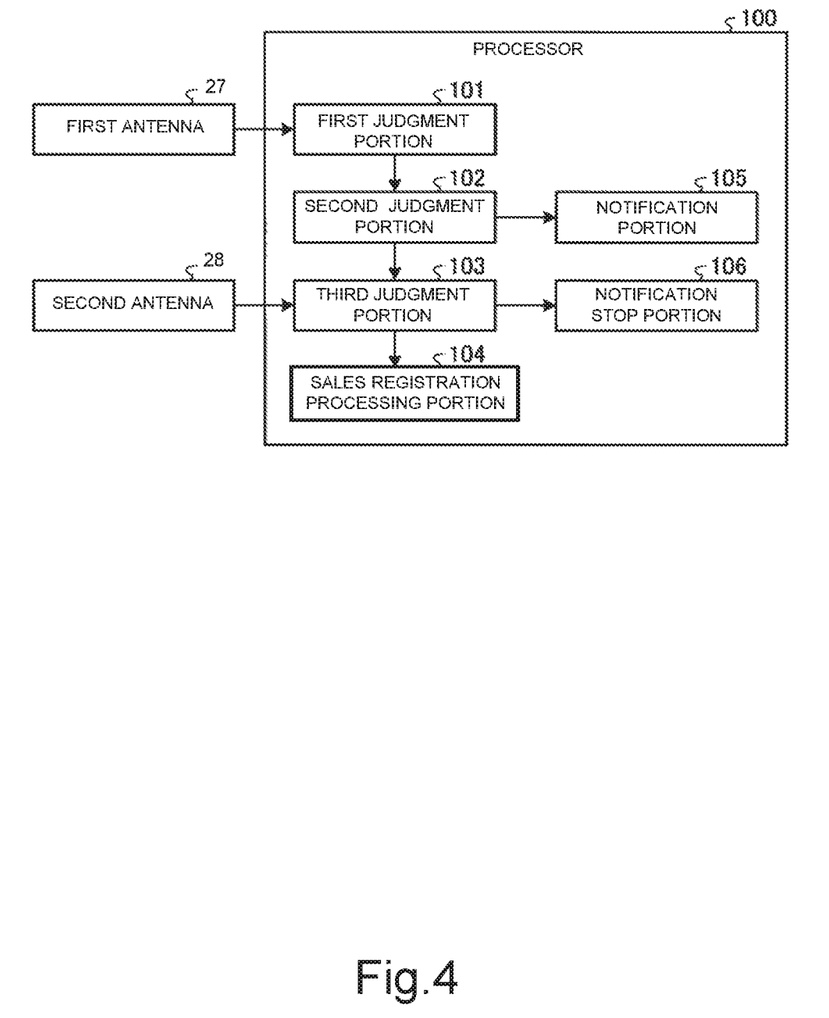
FIG. 4 is a functional block diagram showing a functional configuration of the POS terminal according to the first embodiment.

Next, a functional configuration of the POS terminal 1 will be described. FIG. 4 is a functional block diagram sowing a functional configuration of the POS terminal 1. As shown in FIG. 4, the processor 100 of the POS terminal 1 executes the control program which is stored in the control program portion 141 and has been developed in the RAM 13, to function as a first judgment portion 101, a second judgment portion 102, a third judgment portion 103, a sales registration processing portion 104, a notification portion 105, a notification stop portion 106.

The first judgment portion 101 (the processor 100) shown in FIG. 4 judges whether the first antenna 27 to receive, from a wireless tag attached to a commodity, tag information uniquely identifying the relevant commodity has received the tag information.

The second judgment portion 102 (the processor 100) shown in FIG. 4 judges whether the relevant wireless tag is a wireless tag required to be detached from the commodity, based on the tag information which is judged to have been received by the first judgment portion 101. The second judgment portion 102 searches the commodity master 142, based on the commodity code included in the tag information which is judged to have been received by the first judgment portion 101. The second judgment portion 102 searches the commodity master 142, to confirm the flag information stored in the notification flag portion 1424 corresponding to the relevant commodity code. The second judgment portion 102 judges whether the relevant wireless tag is a wireless tag required to be detached from the commodity, based on the confirmed flag information. When the flag information "1" is stored in the notification flag portion 1424, the second judgment portion 102 judges that the relevant wireless tag is a wireless tag required to be detached from the commodity. When the flag information "0" is stored in the notification flag portion 1424, the second judgment portion 102 judges that the relevant wireless tag is a wireless tag not required to be detached from the commodity.

The second judgment portion 102 judges that a wireless tag attached to a commodity to be possibly heated by a microwave oven, such as a box lunch, for example, is a wireless tag required to be detached from the commodity. The second judgment portion 102 judges that a wireless tag attached to a commodity not to be possibly heated by a microwave oven, such as chocolate, for example, is a wireless tag not required to be detached from the commodity.

The third judgment portion 103 (the processor 100) shown in FIG. 4 judges whether the second antenna 28 has received the tag information of the wireless tag which is judged to be a wireless tag required to be detached by the second judgment portion 102. As described above, the second antenna 28 is an antenna which is provided in the recovery box 3 to recover the detached wireless tag, and receives the above-described tag information from the wireless tag recovered in the recovery box 3. The third judgment portion 103 compares the commodity identification information included in the tag information which the second antenna 28 has received with the commodity identification information included in the tag information stored in the tag information portion 132 in a step S13 of a processing described later. Here, the commodity identification information is information to uniquely identify an individual article, as described above. When the above-described both commodity identification informations are coincident, the third judgment portion 103 judges that the second antenna 28 has received the tag information of the wireless tag which is judged to be the wireless tag required to be detached by the second judgment portion 102. That the commodity identification information included in the tag information which the second antenna 28 has received and the commodity identification information included in the tag information stored in the tag information portion 132 in the step S13 of the processing described later are coincident indicates that the wireless tag from which the first antenna 27 has received the tag information and the wireless tag from which the second antenna 28 has received the tag information are the same wireless tag. That is, this means that the salesclerk has made the tag information of the wireless tag attached to the commodity to be read by the first antenna 27, has detached the relevant wireless tag from the commodity, and has recovered the relevant wireless tag in the recovery box 3.

In addition, the third judgment portion 103 compares the commodity identification information included in the tag information which the second antenna 28 has received with the commodity identification information included in the tag information stored in the tag information portion 132 in the step S13 of the processing described later. When the above-described both commodity identification informations are not coincident, the third judgment portion 103 judges that the second antenna 28 has not received the tag information of the wireless tag which is judged to be the wireless tag required to be detached by the second judgment portion 102.

When the third judgment portion 103 judges that the second antenna 28 has received the tag information, the sales registration processing portion 104 (the processor 100) shown in FIG. 4 executes a sales registration processing of the relevant commodity, based on the relevant received tag information.

When the second judgment portion 102 judges that the wireless tag from which the first antenna 27 has received the tag information is a wireless tag required to be detached from the relevant commodity, the notification portion 105 (the processor 100) shown in FIG. 4 makes the display device 22 for salesclerk display information of notification to the effect that the relevant wireless tag is detached. The information of notification is a message to instruct to detach the wireless tag from the commodity, for example. In this case, the display device 22 for salesclerk displays the above-described message as a notification device.

The notification stop portion 106 (the processor 100) shown in FIG. 4 erases the information of notification to the effect that the wireless tag is detached which has been made to display on the display device 22 for salesclerk by the notification portion 105. That is, when the third judgment portion 103 judges that the second antenna 28 has received the tag information of the wireless tag which is judged to be the wireless tag required to be detached from the relevant commodity by the second judgment portion 102, the notification stop portion 106 erases the information of notification to the effect that the wireless tag is detached which has been made to display on the display device 22 for salesclerk by the notification portion 105. By this means, the display device 22 for salesclerk stops displaying the above-described information of notification.

Figure 5:
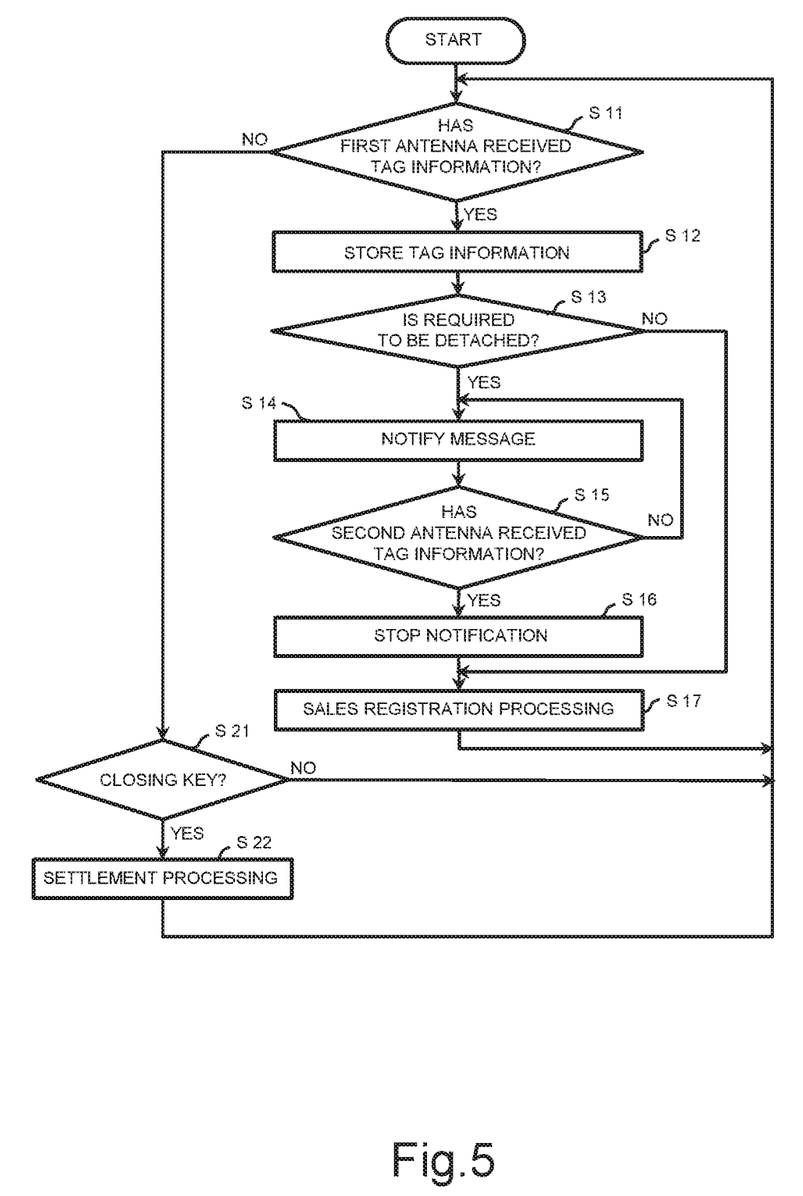
FIG. 5 is a flow chart showing a control processing of the POS terminal according to the first embodiment.

Next, a control of the POS terminal 1 will be described. A salesclerk to operate the POS terminal 1 makes a wireless tag attached to a commodity which a customer purchases closer to the first antenna 27 to make tag information to be read. FIG. 5 is a flow chart showing a control processing of the processor 100 of the POS terminal 1. As shown in FIG. 5, in a step S11, the first judgment portion 101 (the processor 100) of the POS terminal 1 judges whether the first antenna 27 has received the tag information. When the first judgment portion 101 judges that the first antenna 27 has received the tag information (Yes in the step S11), the processing of the processor 100 proceeds to a step S12. In the step S12, the processor 100 stores the tag information which the first antenna 27 has received in the tag information portion 132.

Next, in the step S13, the second judgment portion 102 (the processor 100) searches the commodity master 142, based on a commodity code included in the tag information which the first judgment portion 101 judges to have been received. And the second judgment portion 102 judges whether the wireless tag from which the tag information has been received by the first antenna 27 is a wireless tag required to be detached from the commodity, based on the flag information (refer to FIG. 3) stored in the notification flag portion 1424 of the commodity master 142 in association with the relevant commodity code. When the second judgment portion 102 judges that the relevant wireless tag is the wireless tag required to be detached from the commodity (Yes in the step S13), the processing of the processor 100 proceeds to a step S14. In the step S14, the notification portion 105 (the processor 100) notifies that the wireless tag is detached from the commodity, using the display device 22 for salesclerk. Specifically, the notification portion 105 displays a message to instruct to detach the wireless tag from the commodity on the display device 22 for salesclerk. Having seen the displayed message, the salesclerk detaches the wireless tag from the commodity. The salesclerk puts the detached wireless tag in the recovery box 3 to recover the relevant wireless tag.

Next, in a step S15, the third judgment portion 103 (the processor 100) judges whether the second antenna 28 has received the tag information of the wireless tag which is judged to be the wireless tag required to be detached by the second judgment portion 102. While the second antenna 28 does not receive the tag information of the wireless tag which is judged to be the wireless tag required to be detached by the second judgment portion 102 (No in the step S15), the processing of the processor 100 returns to the step S14. That is, until the second antenna 28 receives the same tag information as the tag information which the first antenna 27 has received, the processor 100 continues to display the message on the display device 22 for salesclerk for waiting. When the third judgment portion 103 judges that the second antenna 28 has received the tag information of the wireless tag which is judged to be the wireless tag required to be detached by the second judgment portion 102 (Yes in the step S15), the processing of the processor 100 proceeds to a step S16. In the step S16, the notification stop portion 106 (the processor 100) erases the message to the effect that the wireless tag is detached which has been made to display on the display device 22 for salesclerk by the notification portion 105. That is, the notification stop portion 106 stops displaying the above-described message by the display device 22 for salesclerk.

Next, in a step S17, the sales registration processing portion 104 (the processor 100) executes a sales registration processing of the relevant commodity, based on the tag information which the first antenna 27 and the second antenna 28 have received. And when the sales registration processing is finished, the processing of the processor 100 returns to the step S11. In addition, in the step S13, when the second judgment portion 102 judges that the wireless tag from which the tag information has been received by the first antenna 27 is not the wireless tag required to be detached from the commodity (No in the step S13), the processing of the processor 100 proceeds to a step S17. In the step S17, the sales registration processing portion 104 executes the sales registration processing in the above-described manner.

In addition, in the step S11, when the first judgment portion 101 judges that the first antenna 27 has not received the tag information (No in the step S11), the processing of the processor 100 proceeds to a step S21. In the step S21, the processor 100 judges whether the closing key 211 has been operated. When the processor 100 judges that the closing key 211 has been operated, the processing of the processor 100 proceeds to a step S22. In the step S22, the processor 100 executes a settlement processing related to the relevant transaction, based on the commodity information which has been subjected to the sales registration processing in the step S17 and is stored in the commodity information portion 131. And when the settlement processing is finished, the processing of the processor 100 returns to the step S11. In addition, when the processor judges that the closing key 211 has not been operated (No in the step S21), the processing of the processor 100 returns to the step S11.

According to the first embodiment like this, whether the wireless tag attached to the relevant commodity is a wireless tag required to be detached from the commodity is judged, based on the commodity code included in the tag information received by the first antenna 27. And when the wireless tag attached to the commodity is judged to be the wireless tag required to be detached from the relevant commodity (refer to Yes of the step S13), provided that the commodity identification information included in the tag information received by the first antenna 27 coincides with the commodity identification information included in the tag information received by the second antenna 28, the sales registration processing related to the relevant commodity is executed (refer to Yes of the step S15, and the step S17). In other words, when the salesclerk forgets to detach the wireless tag from the commodity and does not house it in the recovery box 3, the salesclerk cannot perform the sales registration processing of the relevant commodity. For the reason, the salesclerk can notice to forget to detach the wireless tag from the commodity. Accordingly, the wireless tag attached to the sold commodity can surely be detached from the relevant commodity.

Second Embodiment

Next, a second embodiment will be described. The second embodiment is different from the first embodiment in the data configuration in the commodity master 142. In addition, the second embodiment has the configurations and so on shown in FIG. 1, FIG. 2, FIG. 4 and FIG. 5 which are equivalent to the first embodiment.

Figure 6:
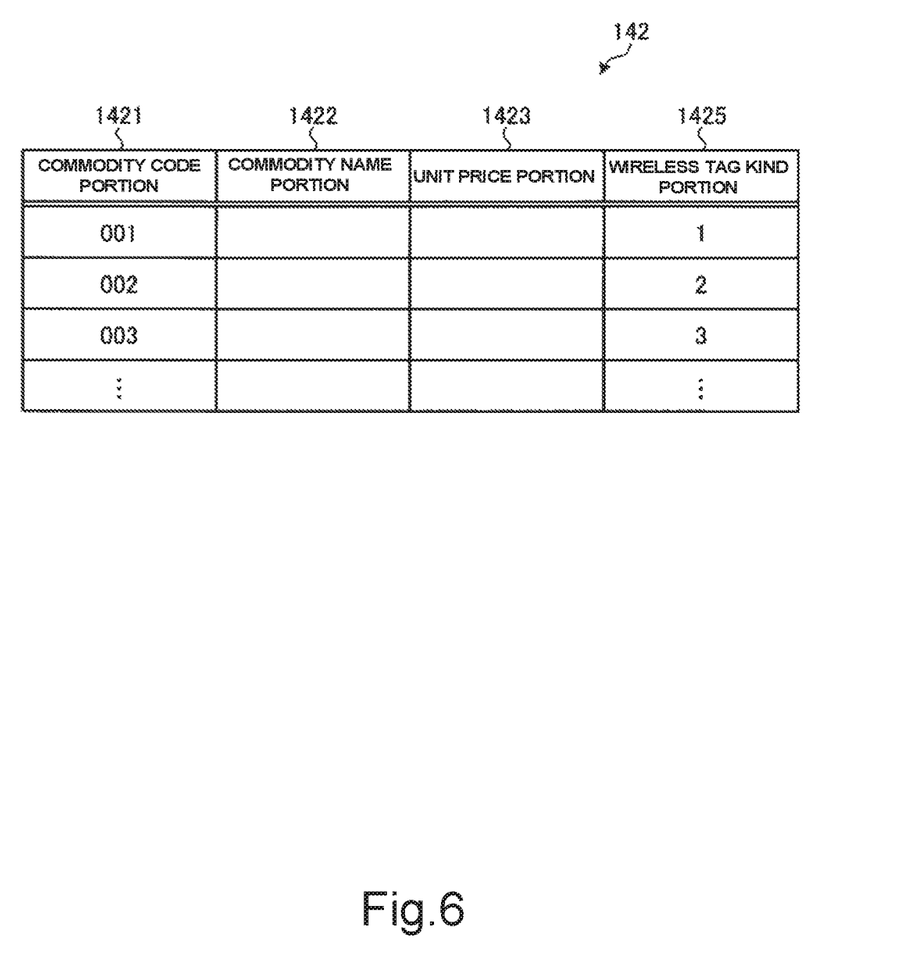
FIG. 6 is a memory map showing an example of a data configuration of a commodity master according to a second embodiment.

FIG. 6 is a memory map showing an example of a data configuration of the commodity master 142 according to the second embodiment. As shown in FIG. 6, the commodity master 142 has the commodity code portion 1421, the commodity name portion 1422, the unit price portion 1423, and a wireless tag kind storage area 1425. In addition, in the following description, the wireless tag kind storage area 1425 is simply called the wireless tag kind portion 1425 (refer to FIG. 6). The commodity code portion 1421, the commodity name portion 1422, the unit price portion 1423 are the same as the respective portions shown in FIG. 3, and accordingly the description thereof will be omitted. The wireless tag kind portion 1425 stores a kind of the wireless tag attached to the relevant commodity, in association with the commodity code stored in the commodity code portion 1421. A kind of the wireless tag in which "1" is stored in the wireless tag kind portion 1425 is an RFID tag, for example. That is, an RFID tag is attached to a commodity of the commodity code "001". In addition, a kind of the wireless tag in which "2" is stored in the wireless tag kind portion 1425 is a crime prevention tag. That is, a crime prevention tag is attached to a commodity of the commodity code "002". In addition, a kind of the wireless tag in which "3" is stored in the wireless tag kind portion 1425 is a wireless tag different from the above-described wireless tags. That is, a wireless tag different from the above-described wireless tags is attached to a commodity of the commodity code "003".

Figure 7:
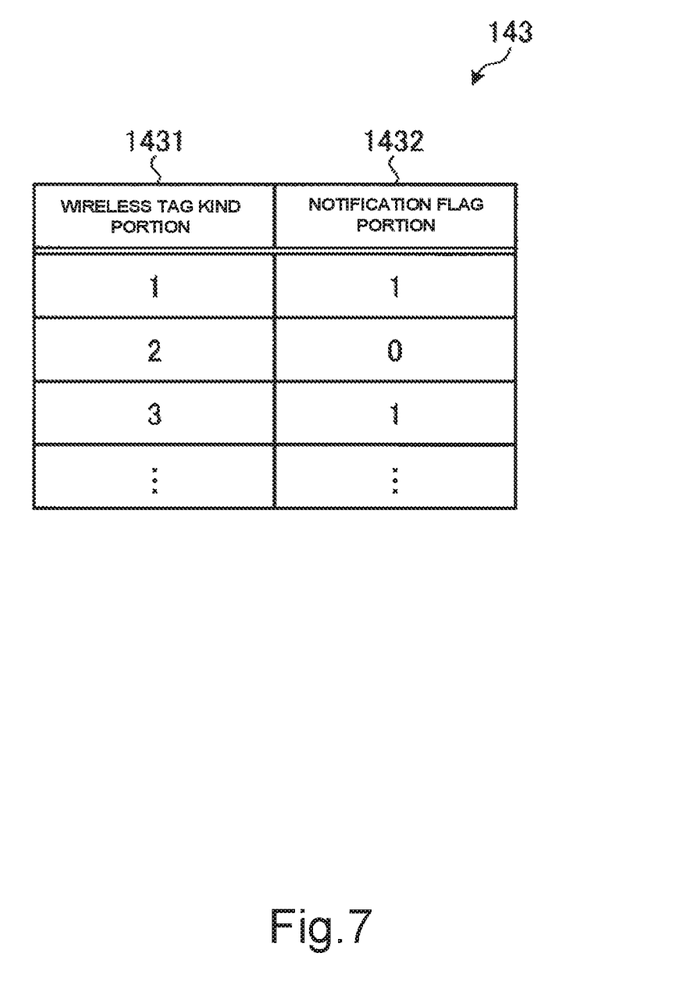
FIG. 7 is a memory map showing an example of a data configuration of a first correspondence portion according to the second embodiment.

In addition, in the second embodiment, the storage device 14 has a first correspondence storage area 143, as shown in FIG. 7. In addition, in the following description, the first correspondence storage area 143 is simply called the first correspondence portion 143. The first correspondence portion 143 stores a kind of the wireless tag, and flag information for judging, by the second judgment portion 102, whether the wireless tag attached to the commodity is a wireless tag required to be detached from the relevant commodity, in association. The first correspondence portion 143 has a wireless tag kind storage area 1431 and a notification flag storage area 1432. In the following description, the wireless tag kind storage area 1431 and the notification flag storage area 1432 are simply called the wireless tag kind portion 1431 and the notification flag portion 1432, respectively (refer to FIG. 7). The wireless tag kind portion 1431 stores information equivalent to that of the wireless tag kind portion 1425 of the commodity master 142. The notification flag portion 1432 stores flag information indicating whether the wireless tag of the kind stored in the wireless tag kind portion 1431 is a wireless tag required to be detached from the commodity. When flag information of the notification flag portion 1432 is "1", the relevant flag information "1" indicates that the wireless tag of the relevant kind attached to the commodity is a wireless tag required to be detached from the commodity. When flag information of the notification flag portion 1432 is "0", the relevant flag information "0" indicates that the wireless tag of the relevant kind attached to the relevant commodity is a wireless tag not required to be detached from the relevant commodity.

In the example of FIG. 6, in a commodity of the commodity code "001", a wireless tag kind is "1". And as shown in the example of FIG. 7, when the wireless tag kind is "1", flag information is "1". For the reason, regarding the commodity of the commodity code "001" in which the wireless tag kind is "1", the wireless tag is required to be detached from the commodity. In addition, as shown in the example of FIG. 6, in a commodity of the commodity code "002", the wireless tag kind is "2". And as shown in the example of FIG. 7, when the wireless tag kind is "2", the flag information is "0". For the reason, regarding the commodity of the commodity code "002" in which the wireless tag kind is "2", the wireless tag is not required to be detached from the commodity.

In addition, in the case of the second embodiment, the second judgment portion 102 judges whether the wireless tag is a wireless tag required to be detached from the commodity, for each kind of the wireless tag. For example, when a crime prevention tag (a wireless tag kind is "2") is attached to a commodity, the second judgment portion 102 judges it to be a wireless tag required to be detached from the commodity. When a wireless tag other than a crime prevention tag (for example, a wireless tag kind is "3") is attached to a commodity, the second judgment portion 102 judges it to be a wireless tag not required to be detached from the commodity.

In the judgment in the above-described step S13, the processor 100 recognizes a kind of the wireless tag stored in the wireless tag kind portion 1425 in association with the relevant commodity, based on the commodity code included in the received tag information. And the processor 100 judges whether the relevant wireless tag is a wireless tag required to be detached from the commodity, based on the flag information stored in the notification flag portion 1432 in association with the kind of the relevant wireless tag stored in the first correspondence portion 143.

According to the second embodiment like this, whether the wireless tag attached to the relevant commodity is a wireless tag required to be detached from the commodity is judged, based on the commodity code included in the tag information received by the first antenna 27. And when the wireless tag attached to the relevant commodity is judged to be the wireless tag required to be detached from the relevant commodity, provided that the commodity identification information included in the tag information received by the first antenna 27 coincides with the commodity identification information included in the tag information received by the second antenna 28, the sales registration processing related to the relevant commodity is executed. In other words, when the salesclerk forgets to detach the wireless tag from the commodity and does not house it in the recovery box 3, the salesclerk cannot perform the sales registration processing of the relevant commodity. For the reason, the salesclerk can notice to forget to detach the wireless tag from the commodity. Accordingly, the wireless tag attached to the sold commodity can surely be detached from the relevant commodity.

Third Embodiment

Next, a third embodiment will be described. The third embodiment is different from the first embodiment in the data configuration in the commodity master 142. In addition, the third embodiment has the configurations and so on shown in FIG. 1, FIG. 2, FIG. 4 and FIG. 5 which are equivalent to the first embodiment.

Figure 8:
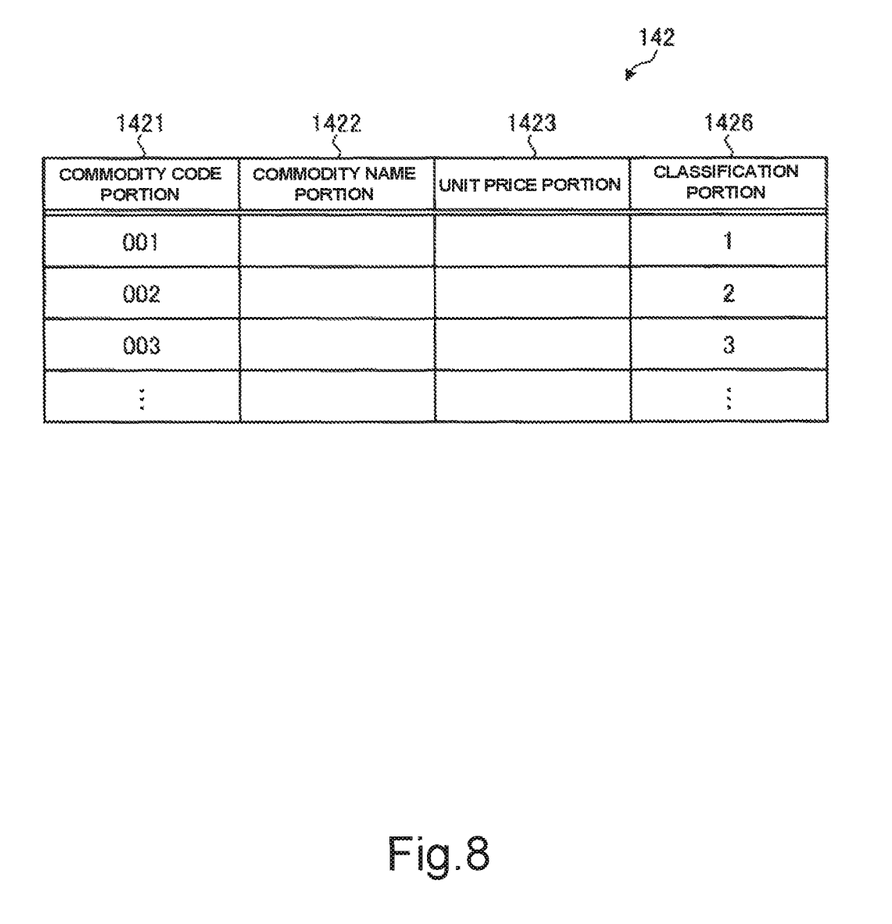
FIG. 8 is a memory map showing an example of a data configuration of a commodity master according to a third embodiment.

FIG. 8 is a memory map showing an example of a data configuration of the commodity master 142 according to the third embodiment. As shown in FIG. 8, the commodity master 142 has the commodity code portion 1421, the commodity name portion 1422, the unit price portion 1423, a classification storage area 1426. In addition, in the following description, the classification storage area 1426 is simply called the classification portion 1426 (refer to FIG. 8). The commodity code portion 1421, the commodity name portion 1422, the unit price portion 1423 are the same as the respective portions shown in FIG. 3, and accordingly the description thereof will be omitted. The classification portion 1426 stores a higher classification to which the relevant commodity belongs, in association with the commodity code stored in the commodity code portion 1421. A commodity in which "1" is stored in the classification portion 1426 belongs to a classification 1. That is, the commodity of the commodity code "001" belongs to the classification 1. In addition, a commodity in which "2" is stored in the classification portion 1426 belongs to a classification 2. That is, the commodity of the commodity code "002" belongs to the classification 2. In addition, a commodity in which "3" is stored in the classification portion 1426 belongs to a classification 3. That is, the commodity of the commodity code "003" belongs to the classification 3.

Figure 9:
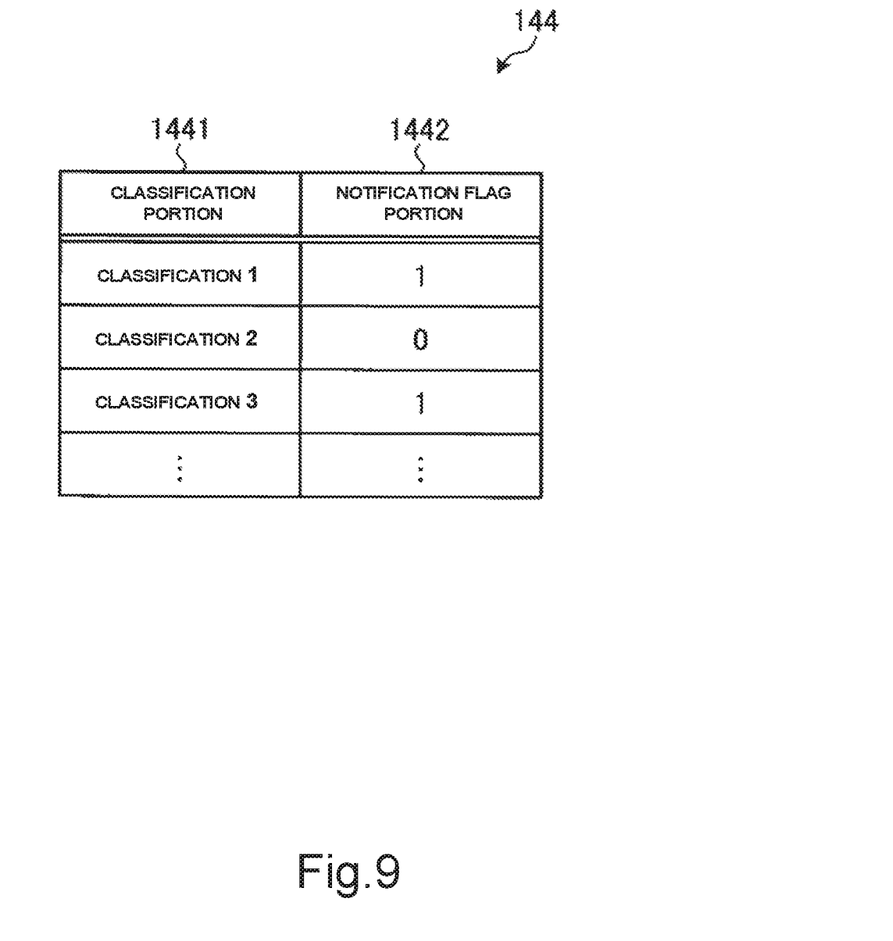
FIG. 9 is a memory map showing an example of a data configuration of a second correspondence portion according to the third embodiment.

In addition, in the third embodiment, the storage device 14 has a second correspondence storage area 144, as shown in FIG. 9. In addition, in the following description, the second correspondence storage area 144 is simply called the second correspondence portion 144. The second correspondence portion 144 stores a classification of the commodity, and flag information for judging, by the second judgment portion 102, whether the wireless tag attached to the commodity is a wireless tag required to be detached from the relevant commodity, in association. That is, the second correspondence portion 144 has a classification storage area 1441 and a notification flag storage area 1442. In addition, in the following description, the classification storage area 1441 and the notification flag storage area 1442 are simply called the classification portion 1441 and the notification flag portion 1442, respectively (refer to FIG. 9). The classification portion 1441 stores information equivalent to that of the classification portion 1426 of the commodity master 142. The notification flag portion 1442 stores flag information indicating whether the wireless tag attached to the commodity of the classification stored in the classification portion 1441 is a wireless tag required to be detached from the relevant commodity. It is indicated that the wireless tag attached to the commodity included in the classification in which the flag information of the notification flag portion 1442 is "1" is a wireless tag required to be detached from the relevant commodity. It is indicated that the wireless tag attached to the commodity included in the classification in which the flag information of the notification flag portion 1442 is "0" is a wireless tag not required to be detached from the commodity.

In the example of FIG. 8, in the commodity of the commodity code "001", the classification is "1". As shown in the example of FIG. 9, when the classification is "1", the flag information is "1". For the reason, regarding the commodity of the commodity code "001" in which the classification is "1", the wireless tag is required to be detached from the relevant commodity. In addition, as shown in the example of FIG. 8, in the commodity of the commodity code "002", the classification is "2". As shown in the example of FIG. 9, when the classification is "2", the flag information is "0". For the reason, regarding the commodity of the commodity code "002" in which the classification is "2", the wireless tag is not required to be detached from the relevant commodity.

In addition, the second judgment portion 102 judges whether the wireless tag attached to the commodity is a wireless tag required to be detached from the relevant commodity, for each classification of the commodity. For example, when the commodity belongs to the classification 1, the second judgment portion 102 judges that the wireless tag attached to the commodity is a wireless tag required to be detached from the relevant commodity. When the commodity belongs to the classification 2, the second judgment portion 102 judges that the wireless tag attached to the commodity is a wireless tag not required to be detached from the commodity.

In the judgment in the step S13, the processor 100 recognizes a classification to which the relevant commodity stored in the classification portion 1426 in association with the relevant commodity belongs, based on the commodity code included in the received tag information. The processor 100 judges whether the wireless tag attached to the commodity is a wireless tag required to be detached from the commodity, based on the flag information stored in the notification flag portion 1442 of the second correspondence portion 144 in association with the recognized classification.

According to the third embodiment like this, whether the wireless tag attached to the relevant commodity is a wireless tag required to be detached from the commodity is judged, based on the commodity code included in the tag information received by the first antenna 27. When the wireless tag attached to the commodity is judged to be the wireless tag required to be detached from the relevant commodity, provided that the commodity identification information included in the tag information received by the first antenna 27 coincides with the commodity identification information included in the tag information received by the second antenna 28, the sales registration processing related to the relevant commodity is executed. In other words, when the salesclerk forgets to detach the wireless tag from the commodity and does not house it in the recovery box 3, the salesclerk cannot perform the sales registration processing of the relevant commodity. For the reason, the salesclerk can notice to forget to detach the wireless tag from the commodity. Accordingly, the wireless tag attached to the sold commodity can surely be detached from the relevant commodity.

In the embodiments described above, it has been supposed that wireless tags are respectively attached to the whole commodities. However, without being limited to this, the judgment by the first judgment portion, the judgment by the second judgment portion, the judgment by the third judgment portion may be performed to only a commodity attached with a wireless tag. That is, the judgment by the first judgment portion, the judgment by the second judgment portion, the judgment by the third judgment portion may not be performed to a community not attached with a wireless tag. In this case, in the above-described step S11, when the first judgment portion 101 judges that the tag information has not been received by the first antenna 27 (No in the step S11), the processor 100 judges whether the commodity code and so on have been inputted by other means. And when the commodity code and so on have been inputted by other means, the processor 100 executes the sales registration processing of the commodity identified by the commodity code.

In addition, in the embodiments, the notification portion 105 has made the display to the effect that the wireless tag is detached to be performed on the display device 22 for salesclerk as the notification device. However, without being limited to this, the notification portion 105 may make the display to the effect that the wireless tag is detached to be performed on another display device. In addition, the notification portion 105 may perform notification by means other than the display (voice, for example).

In addition, in the embodiments, the description has been made using the recovery box 3 as the recovery device to recover the wireless tag. However, the recovery device may be an object to recover the wireless tag (such as a recovery bag), other than a box.

In addition, the program to be executed in the POS terminal 1 of the embodiment is provided while being recorded in a computer readable recording medium, such as a CD-ROM, a flexible disk (FD), a CD-R, a DVD (Digital Versatile Disk), in a file of an installable format or an executable format.

In addition, the program to be executed in the POS terminal 1 of the embodiment may be configured to be stored on a computer connected to a network such as Internet, and to be provided by being downloaded through the network. In addition, the program to be executed in the POS terminal 1 of the embodiment may be configured to be provided or distributed via a network such as Internet.

In addition, the program to be executed in the POS terminal 1 of the embodiment may be configured to be provided while being previously incorporated in a ROM or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sales data processing apparatus, comprising:
   a first antenna to receive tag information from a wireless tag attached to a commodity being purchased in a sales transaction, the tag information identifying the commodity;
   a recovery location into which wireless tags detached from commodities being purchased in the sales transaction are to be placed;
   a second antenna positioned to receive tag information from a wireless tag placed into the recovery location after being detached from a commodity being purchased in the sales transaction; and
   a processor configured to:
   receive tag information from the first antenna,
   based on the received tag information from the first antenna, determine whether the wireless tag attached to the commodity being purchased in the sales transaction is a wireless tag type that is to be detached from the commodity before completion of the sales transaction, and
   when the wireless tag attached to the commodity being purchased is determined to be the wireless tag type that is to be detached from the commodity before completion of the sales transaction, determine whether the tag information for the wireless tag that was attached to the commodity being purchased has been received by the second antenna, and prevent completion of the sales transaction until the tag information for the wireless tag has been received from the second antenna.

2. The sales data processing apparatus according to claim 1, further comprising:
   a notification device configured to perform a notification if the wireless tag attached to the commodity being purchased is determined to be the wireless tag type that is to be detached from the commodity before completion of the sales transaction.

3. The sales data processing apparatus according to claim 2, wherein
   once the second antenna has received the tag information from the wireless tag that was attached to the commodity being purchased that has been determined to be the wireless tag type that is to be detached from the commodity before completion of the sales transaction, the processor makes the notification device stop the notification.

4. The sales data processing apparatus according to claim 1, wherein
   each wireless tag read by the first antenna is determined to be a wireless tag type that is to be detached from the commodity before completion of the sales transaction or not based on a flag value associated with tag information in a commodity master file.

5. The sales data processing apparatus according to claim 1, wherein
   each wireless tag read by the first antenna is determined to be a wireless tag type that is to be detached from the commodity before completion of the sales transaction or not based on a classification code associated with tag information in a commodity master file.

6. The sales data processing apparatus according to claim 1, wherein the recovery location is a box.

7. A sales data processing method of a sales data processing apparatus having a first antenna to receive tag information from a wireless tag attached to a commodity being purchased in a sales transaction, the tag information uniquely identifying the commodity, a recovery location into which wireless tags detached from commodities being purchased in the sales transaction are to be placed, and a second antenna positioned to receive tag information from a wireless tag placed into the recovery location after being detached from a commodity being purchased in the sales transaction, the method comprising:

receiving tag information from the first antenna;

based on the received tag information from the first antenna, determining whether the wireless tag attached to the commodity being purchased in the sales transaction is a wireless tag type that is to be detached from the commodity before completion of the sales transaction; and when the wireless tag attached to the commodity being purchased is determined to be the wireless tag type that is to be detached from the commodity before completion of the sales transaction, determining whether the tag information for the wireless tag that was attached to the commodity being purchased has been received by the second antenna, and preventing completion of the sales transaction until the tag information for the wireless tag has been received from the second antenna.

8. The sales data processing method according to claim 7, further comprising:

causing a notification device to perform a notification if the wireless tag attached to the commodity being purchased is determined to be the wireless tag type that is to be detached from the commodity before completion of the sales transaction.

9. The sales data processing method according to claim 8, further comprising:

causing the notification device to stop the notification the second antenna has received the tag information from the wireless tag that was attached to the commodity being purchased that has been determined to be the wireless tag type that is to be detached from the commodity before completion of the sales transaction.

10. The sales data processing method according to claim 7 wherein each wireless tag read by the first antenna is determined to be a wireless tag type that is to be detached from the commodity before completion of the sales transaction or not based on a flag value associated with tag information in a commodity master file.

11. The sales data processing method according to claim 7, wherein each wireless tag read by the first antenna is determined to be a wireless tag type that is to be detached from the commodity before completion of the sales transaction or not based on a classification code associated with tag information in a commodity master file.

12. The sales data processing method according to claim 7, wherein the recovery location is a box.

* * * * *